(12) United States Patent
Gilson et al.

(10) Patent No.: US 12,574,320 B2
(45) Date of Patent: Mar. 10, 2026

(54) METHODS, SYSTEMS, AND DEVICES FOR PROVISIONING AND IMPLEMENTING AN INTELLIGENT EDGE LINK ON A ROUTER

(71) Applicant: CIENA CORPORATION, Hanover, MD (US)

(72) Inventors: David H Gilson, Honolulu, HI (US); Wade Aaron Miller, Medical Lake, WA (US); Sai Madhavi Vadlamudi, San Jose, CA (US); Padma Sanampudi, San Jose, CA (US); Praveen Kumar Kejriwal, San Jose, CA (US)

(73) Assignee: CIENA CORPORATION, Hanover, MD (US)

( * ) Notice: Subject to any disclaimer, the term of this patent is extended or adjusted under 35 U.S.C. 154(b) by 106 days.

(21) Appl. No.: 18/498,462

(22) Filed: Oct. 31, 2023

(65) Prior Publication Data

US 2025/0141795 A1    May 1, 2025

(51) Int. Cl.
*H04L 45/586* (2022.01)
*H04L 45/02* (2022.01)
*H04L 45/50* (2022.01)

(52) U.S. Cl.
CPC ............ *H04L 45/586* (2013.01); *H04L 45/02* (2013.01); *H04L 45/50* (2013.01)

(58) Field of Classification Search
CPC ........ H04L 45/586; H04L 45/02; H04L 45/50

USPC ......................................................... 709/238
See application file for complete search history.

(56) References Cited

U.S. PATENT DOCUMENTS

| | | | |
|---|---|---|---|
| 12,155,569 B1 * | 11/2024 | Cirkovic | H04L 45/66 |
| 2008/0205402 A1 * | 8/2008 | McGee | H04L 61/5069 |
| | | | 370/392 |
| 2015/0016456 A1 * | 1/2015 | Ramanathan | H04L 45/306 |
| | | | 370/392 |
| 2015/0089058 A1 * | 3/2015 | Hu | H04L 41/0894 |
| | | | 709/225 |
| 2018/0041555 A1 * | 2/2018 | Manohar | H04L 45/16 |
| 2018/0159797 A1 * | 6/2018 | Cudak | H04L 41/28 |
| 2023/0139272 A1 * | 5/2023 | Niu | H04L 63/1441 |
| | | | 709/238 |
| 2023/0198676 A1 * | 6/2023 | K N | H04L 41/14 |
| | | | 370/236 |
| 2024/0022472 A1 * | 1/2024 | Krishnamurthy | H04L 41/0894 |
| 2025/0141795 A1 | 5/2025 | Gilson et al. | |

* cited by examiner

*Primary Examiner* — Moustafa M Meky
*Assistant Examiner* — Elizabeth Kassa
(74) *Attorney, Agent, or Firm* — Guntin & Gust, PLC; Atanu Das

(57) ABSTRACT

Aspects of the subject disclosure may include, for example, provisioning the router with a first application, and provisioning the router with a first intelligent edge link associated with the first application within a network operating system. The first application is separate from the network operating system. Further embodiments include mapping the first intelligent edge link to a first virtual interface associated with the first application. The first virtual interface is within the first application separate from the network operating system. Other embodiments are disclosed.

20 Claims, 11 Drawing Sheets

100

<u>100</u>

200

400

500

600

700

800

900

1000

METHODS, SYSTEMS, AND DEVICES FOR PROVISIONING AND IMPLEMENTING AN INTELLIGENT EDGE LINK ON A ROUTER

FIELD OF THE DISCLOSURE

The subject disclosure relates to methods, systems, and devices for provisioning and implementing an intelligent edge link on a router.

BACKGROUND

Traditionally, routers have combined functionality of the core functions with another enhanced $3^{rd}$ party application sharing the same forwarding-plane (e.g., a routing device with combined BNG application that includes subscriber management and routing functions) by having the enhanced $3^{rd}$ party application integrated within the Network Operating System (NOS). Further, the router includes software components provisioning the shared forwarding-plane having full knowledge of how the forwarding plane satisfies the end-to-end functional needs in its forwarding plane pipelines. Additionally, the $3^{rd}$ party application and routing functionality can satisfy the end-to-end functional needs using typical NOS interfaces (e.g., IP interfaces). In addition, a router with augmented $3^{rd}$ party application functionality can often need to be a $3^{rd}$ party application fully integrated within the NOS and be aware of the details as well as constraints of the NOS encumbering the significant cost of integration of the $3^{rd}$ party application into the NOS.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for provisioning the router with a first application, and provisioning the router with a first intelligent edge link associated with the first application within a network operating system. The first application is separate from the network operating system. Further embodiments include mapping the first intelligent edge link to a first virtual interface associated with the first application. The first virtual interface is within the first application separate from the network operating system. Other embodiments are described in the subject disclosure.

One or more aspects of the subject disclosure include a router, comprising a processing system including a processor, and a memory that stores executable instructions that, when executed by the processing system, facilitate performance of operations. The operations can comprise provisioning the router with a first application, and provisioning the router with a first intelligent edge link associated with the first application within a network operating system. The first application is separate from the network operating system.

Further operations can comprise mapping the first intelligent edge link to a first virtual interface associated with the first application. The first virtual interface is within the first application separate from the network operating system.

One or more aspects of the subject disclosure include a non-transitory machine-readable medium, comprising executable instructions that, when executed by a router including a processor, facilitate performance of operations. The operations can comprise provisioning the router with an application, and provisioning the router with a first intelligent edge link associated with the application within a network operating system. The application is separate from the network operating system. Further operations can comprise mapping the first intelligent edge link to a first virtual interface associated with the application. The first virtual interface is within the application separate from the network operating system.

One or more aspects of the subject disclosure include a method. The method can comprise provisioning, by a router including a processor, an application, and provisioning, by the router, a first intelligent edge link associated with the application within a network operating system. The application is separate from the network operating system. Further, the method can comprise mapping, by the router, the first intelligent edge link to a first virtual interface associated with the application. The first virtual interface is within the application separate from the network operating system.

Figure 1:
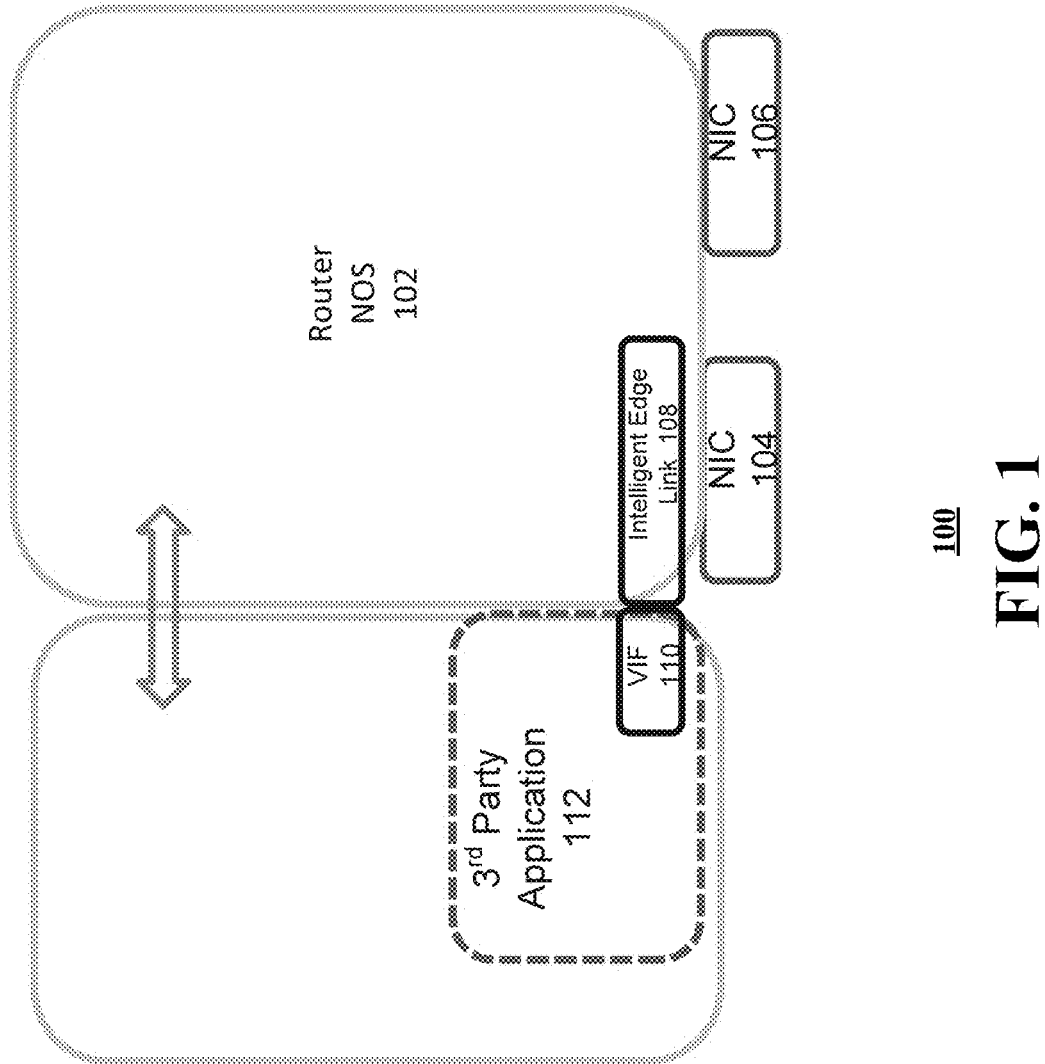
FIGS. 1-9 are block diagrams illustrating exemplary, non-limiting embodiments of provisioning and implementing an intelligent edge link in accordance with various aspects described herein.

FIGS. 1-9 are block diagrams illustrating exemplary, non-limiting embodiments of provisioning and implementing an intelligent edge link in accordance with various aspects described herein. Referring to FIG. 1, in one or more embodiments, router 100 can comprise a network operating system (NOS) 102 communicatively coupled to a network interface card (NIC) 104 (access side-communicating with user end communication devices) and a NIC 106 (network side-communicating with other network devices). Further, a $3^{rd}$ party application 112 can be provisioned on the router 100 that is distinct (i.e., not integrated within the NOS 102). In addition, an intelligent edge link 108 can be provisioned on the router 100 that is associated with the $3^{rd}$ party application 112. Also, the intelligent edge link 108 can be mapped to a virtual interface (VIF) 110 within the $3^{rd}$ party application 112 to receive data associated with the $3^{rd}$ party application 112 from the intelligent edge 108 via the NIC 104. The provisioning of the $3^{rd}$ party application 112 and the intelligent edge link 108 can be performed by the router in response to user-generated input provided by network administration personnel through an input device (e.g., keyboard, touchscreen, etc.).

In one or more embodiments, an intelligent edge link 108 allows a router 100 to interact with applications (e.g., $3^{rd}$ party application 112) in which the router software components (e.g., control plane, data plane) are interacting with the $3^{rd}$ party application 112 as a logical router device in a network with an augmented set of functionality supplied by the $3^{rd}$ party application 112. The logical router device can be a physical hardware router device or a disaggregated set of components acting as a router.

Further, the intelligent edge link 108 is not a typical interface used by a $3^{rd}$ party application (e.g., kernel interface), but is defining a construct that applies to the forwarding plane delineation and software-based provisioning of the forwarding plane. Delineation allows application 112 and router software component to be implemented in different ways from each other through to a forwarding plane. This would not be satisfied/achieved by a kernel/NOS interface although, in some embodiments, the implementation of portions of the delineation may be satisfied by such kernel/ NOS interfaces. Without the intelligent edge link, the typical way to address the functional needs of the $3^{rd}$ party application can be, for example, separate logical devices for $3^{rd}$ party applications and routers with hard boundaries of ports to communicate between them, or $3^{rd}$ party applications that are fully embedded within a NOS and participating as a full-fledged member of the router's ecosystem.

In one or more embodiments, an intelligent edge link can hand off a set of features/characteristics/resources to the $3^{rd}$ party application while ensuring there is no conflict with the NOS features/characteristics/resources, e.g., a range of VLAN identifiers and a range of IP addresses for use by the $3^{rd}$ party application. Further, an intelligent edge link is built as a connection point within a router's own interfaces. For example, an intelligent edge link may connect a full port to the $3^{rd}$ party application. The router/NOS owns and manages the port, but the set of data traffic that ingresses/egresses the port is handled by the $3^{rd}$ party application. In another example, an intelligent edge link may connect a subset of a port to the $3^{rd}$ party application (e.g., a set of VLANs). The router/NOS owns and manages the port and all other VLANs on the port, but the set of data traffic that ingresses/egresses the set of VLANs on the intelligent edge link is handled by the $3^{rd}$ party application. As yet another example, an intelligent edge link may connect a pseudowire (provide end-to-end services across a multiprotocol label switching (MPLS) network) to the $3^{rd}$ party application. The router owns and manages the pseudowire including the underlying infrastructure of the pseudowire, but all data traffic ingressing/ egressing the pseudo wire is handled by the $3^{rd}$ party application.

In one or more embodiments, the management of the intelligent edge link 108 itself is the responsibility of the router/NOS 102 under the domain of all other interfaces that the router/NOS 102 manages, but the functionality attributed to the data traffic of the intelligent edge link 108 is handled by the $3^{rd}$ party application 112. The application 112 may be a $3^{rd}$ party application from the perspective of the router 100 with little or no functional interaction with the router itself. As an example, the $3^{rd}$ party application 112 may manage subscriber data traffic including interacting with an external control plane without influence by the router 100 on which the $3^{rd}$ party application is running and have a lightweight handoff to the router 100 for upstream and downstream routes. In such an example, the $3^{rd}$ party application 112 is unaware of how the router 100 is handling the upstream forwarding (routes) to a data network and the router 100 is unaware of how the $3^{rd}$ party application 112 is handling the downstream forwarding (routes) for subscribers.

A typical use case for an intelligent edge link 108 utilizes a common forwarding plane for the $3^{rd}$ party application 112 functionality and router functionality with well-defined boundaries by the intelligent edge link's definition allowing for efficient collaborative traffic handling in the forwarding plane by both $3^{rd}$ party application and router functionality on the same traffic flows.

The benefits of the intelligent edge link can be common logical device for applications and routers with flexible boundaries of interfaces for communicating between them and a lightweight interaction between an application (including $3^{rd}$ party applications) and the native router's ecosystem. The router may be a physical/virtual router and the $3^{rd}$ party application may be co-located to the router or disaggregated in a cloud-based environment.

In one or more embodiments, use of the intelligent edge link 108 to allow deployment of a user/network application

112 to connect inter-cloud or intra-cloud boundaries. For example, a cloud-based application with third party plugins using the intelligent edge link to obtain any needed resources from the main application along with a mostly transparent connection between them.

In one or more embodiments, an intelligent edge link specifically allows a $3^{rd}$ party application to satisfy its portion of end-end functionality (e.g., subscriber management without knowledge of routing underlays), independently of the NOS satisfying its portion of the end-to-end functionality (e.g., routing underlay and routing towards MPLS networks). Further, a router managed intelligent edge link can handoff functionality to $3^{rd}$ party applications with flexible scoping of the handoff point within its own set of interfaces allowing for a high level of transparency between the $3^{rd}$ party application and router functionality.

Referring to FIG. 1, in one or more embodiments, the router 100 can receive data associated with the $3^{rd}$ party application 112 from a communication device over a communication network via the NIC 104. Further, the router 100 can forward the data to $3^{rd}$ party application 112 over the intelligent edge link 108. In addition, the virtual interface 110 can receive the data from the intelligent edge link 108.

Figure 2:
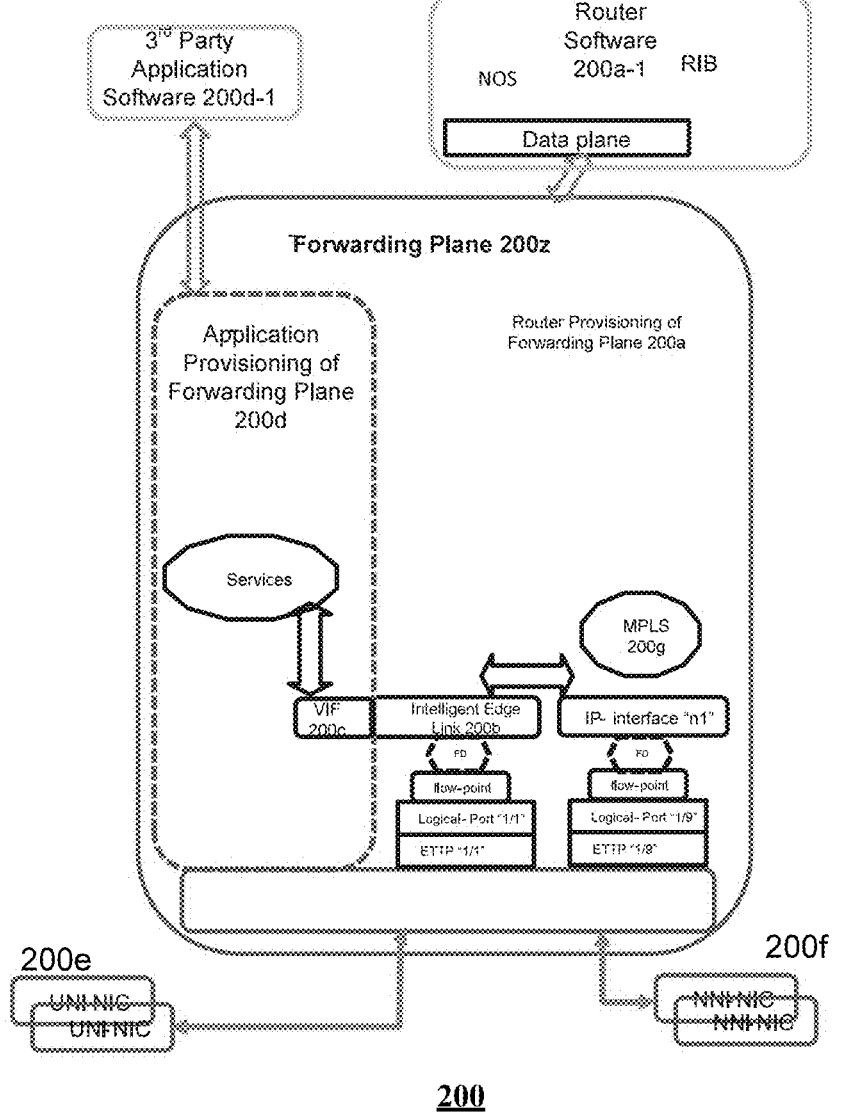

Referring to FIG. 2, in one or more embodiments, router 200 can be provisioned with a $3^{rd}$ party application 200*d*-1 (e.g., broadband network gateway (BNG) application) that is separate from the router software 200*a*-1. Further, forwarding plane 200*z* comprising a router provisioning 200*a*-1 of forwarding plane 200*a* and application provisioning 200*d*-1 of forwarding plane 200*d*. Further, the router 200*a*-1 can provision an intelligent edge link 200*b* associated with the $3^{rd}$ party application 200*d*-1. In addition, the intelligent edge link can receive data traffic associated with the $3^{rd}$ party application 200*d*-1 from a communication device over a communication network via an NIC 200*e* (access side). Further, the intelligent edge link 200*b* can forward the data traffic utilizing MPLS 200*g* over a network side NIC 200*f*.

Figure 3:
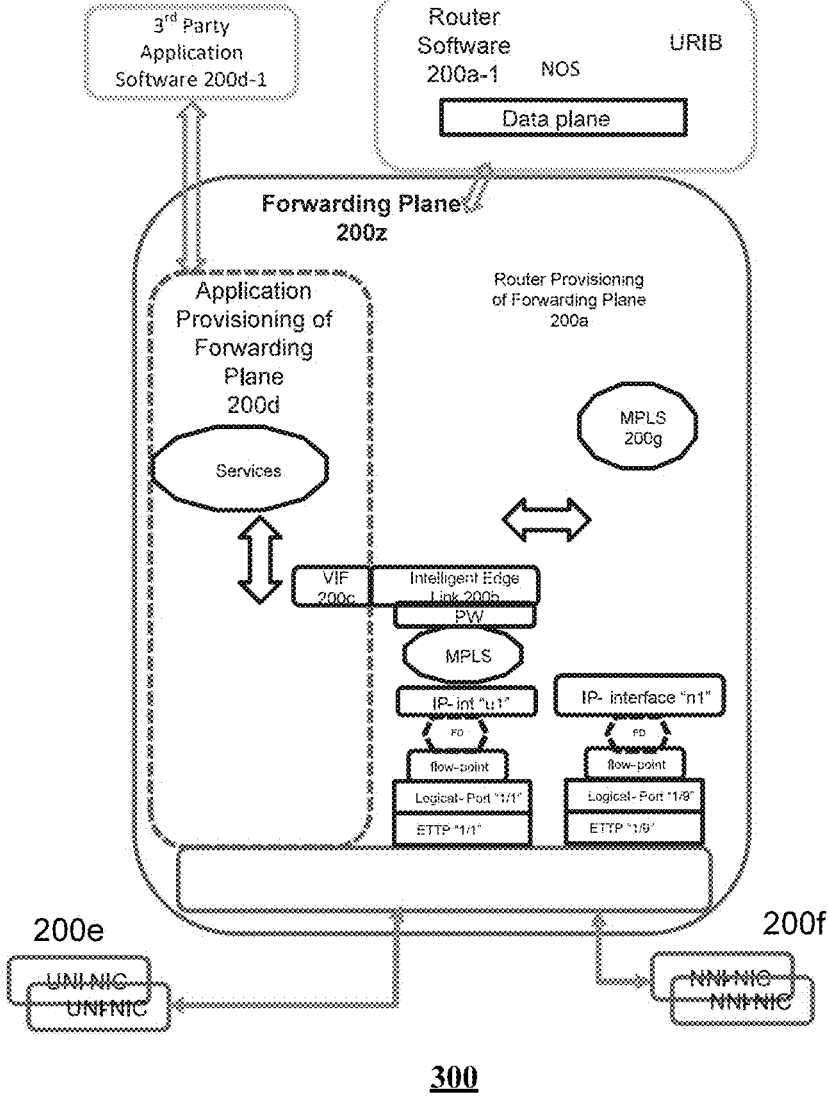
Figure 4:
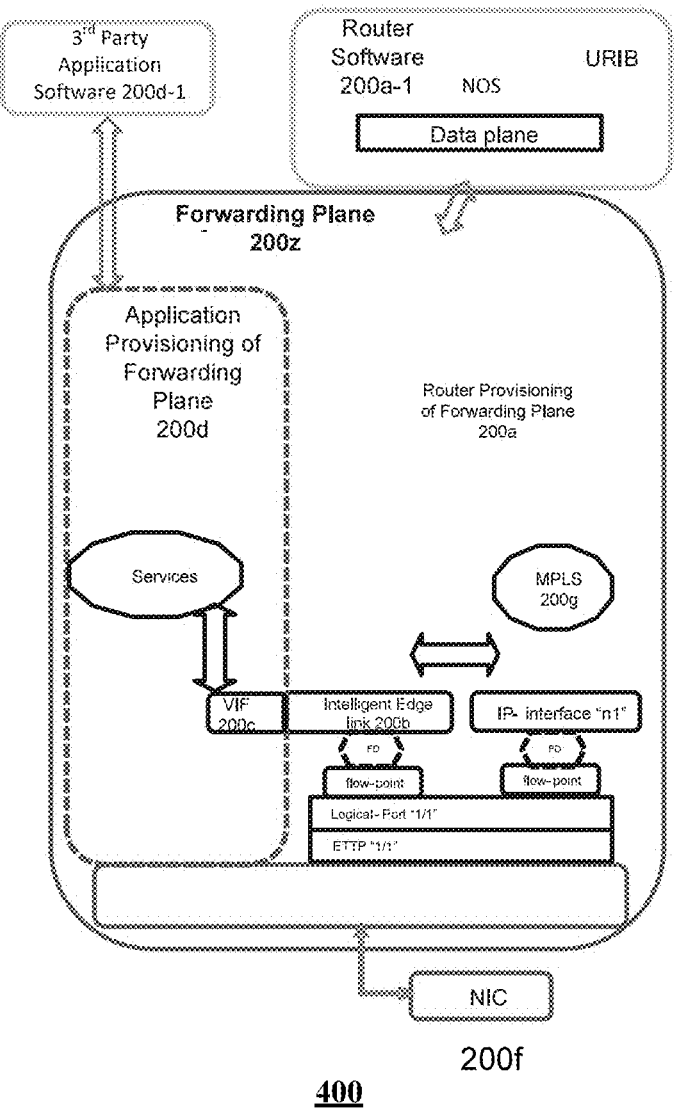

Referring to FIGS. 3 and 4, router 300 and router 400 are similar to router 200 but also include different lower layers (i.e., underlays) between the intelligent edge link 200*b* and the NIC 200*e* and/or NIC 200*f*.

Figure 5:
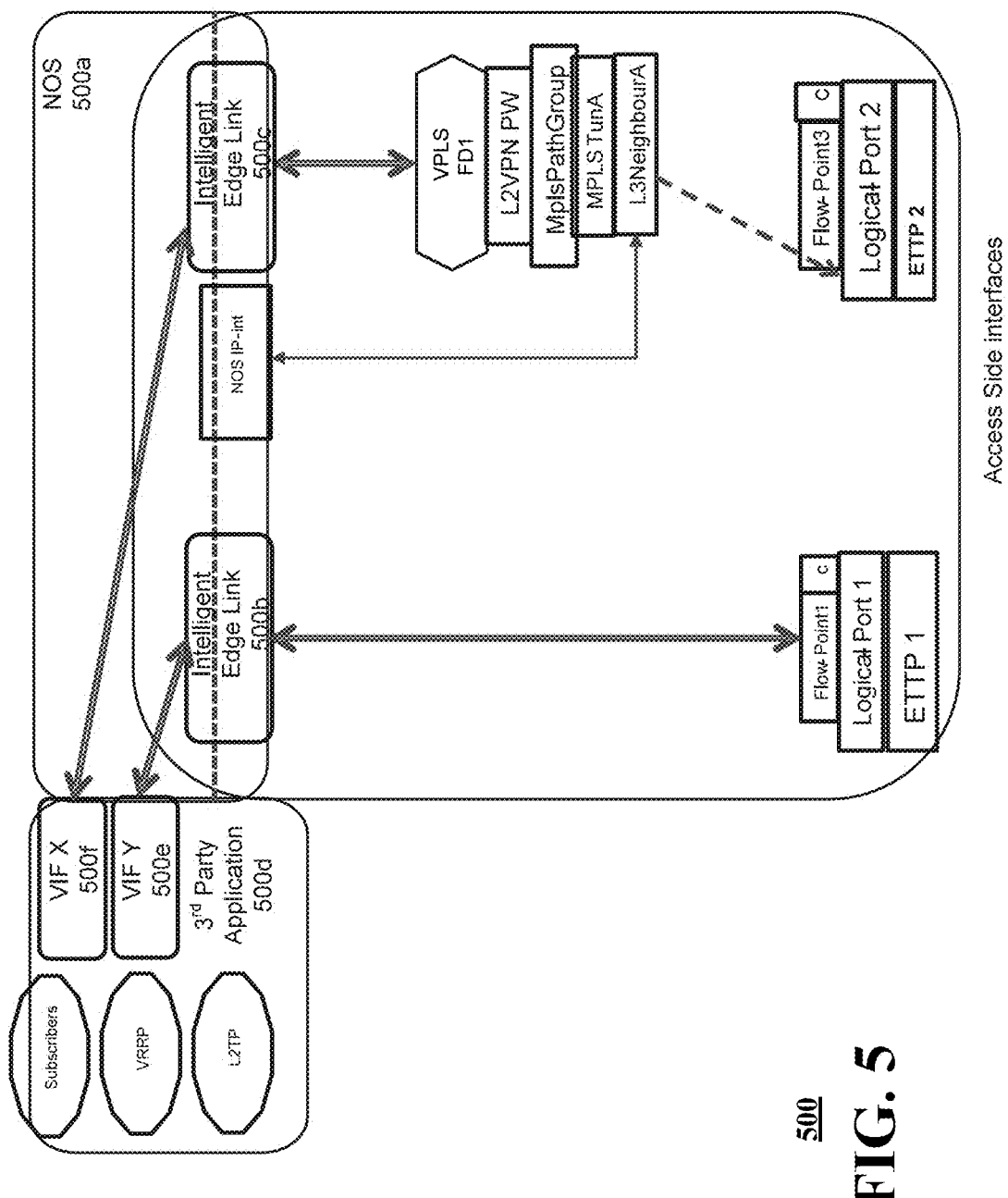

Referring to FIG. 5, in one or more embodiments, an intelligent edge link can define the scope of data traffic to be handed off to a $3^{rd}$ party application (e.g., BNG). Further, the intelligent edge link can encompass a full logical-port (all VLAN-tagged traffic and untagged on a port) as well as a subset (a set of VLANs on a port or all double-tagged traffic on a port). In addition, the intelligent edge link can handle data traffic terminated from a pseudowire. The scope of the intelligent edge link can include FlowPoint classifiers. Also, the intelligent edge link can be a non-routable interface in the NOS that is not provisioned in the kernel) and can generate a new IP interface in the NOS.

In one or more embodiments, the intelligent edge link can also encompass: operational-state representing the underlay; logical-port Operational-state; pseudowire operational state; API to application (UP-C) via gRPC holding the scope, forwarding plane ID, state and more; Clean Connection points of UP-C as an application with NOS; NOS is agnostic to the UP-C application (subscriber functionality); and UP-C is agnostic to NOS (network-side functionality).

Referring to FIG. 5, in one or more embodiments, router 500 can be provisioned with a $3^{rd}$ party application 500*d* (e.g., BNG) separate from NOS 500*a* as well as more than one intelligent edge links, namely intelligent edge link 500*b* and intelligent edge link 500*c* (both of which are associated with application 500*d*). Further, virtual interface 500*e* within $3^{rd}$ party application 500d can be mapped to intelligent edge link 500b and virtual interface 500f within the $3^{rd}$ party application can be mapped to intelligent edge link 500c. Thus, one $3^{rd}$ party application (e.g., BNG) can be associated with more than one or a group of intelligent edge links within the NOS, each of which can be mapped to a virtual interface within the $3^{rd}$ party application.

Figure 6:
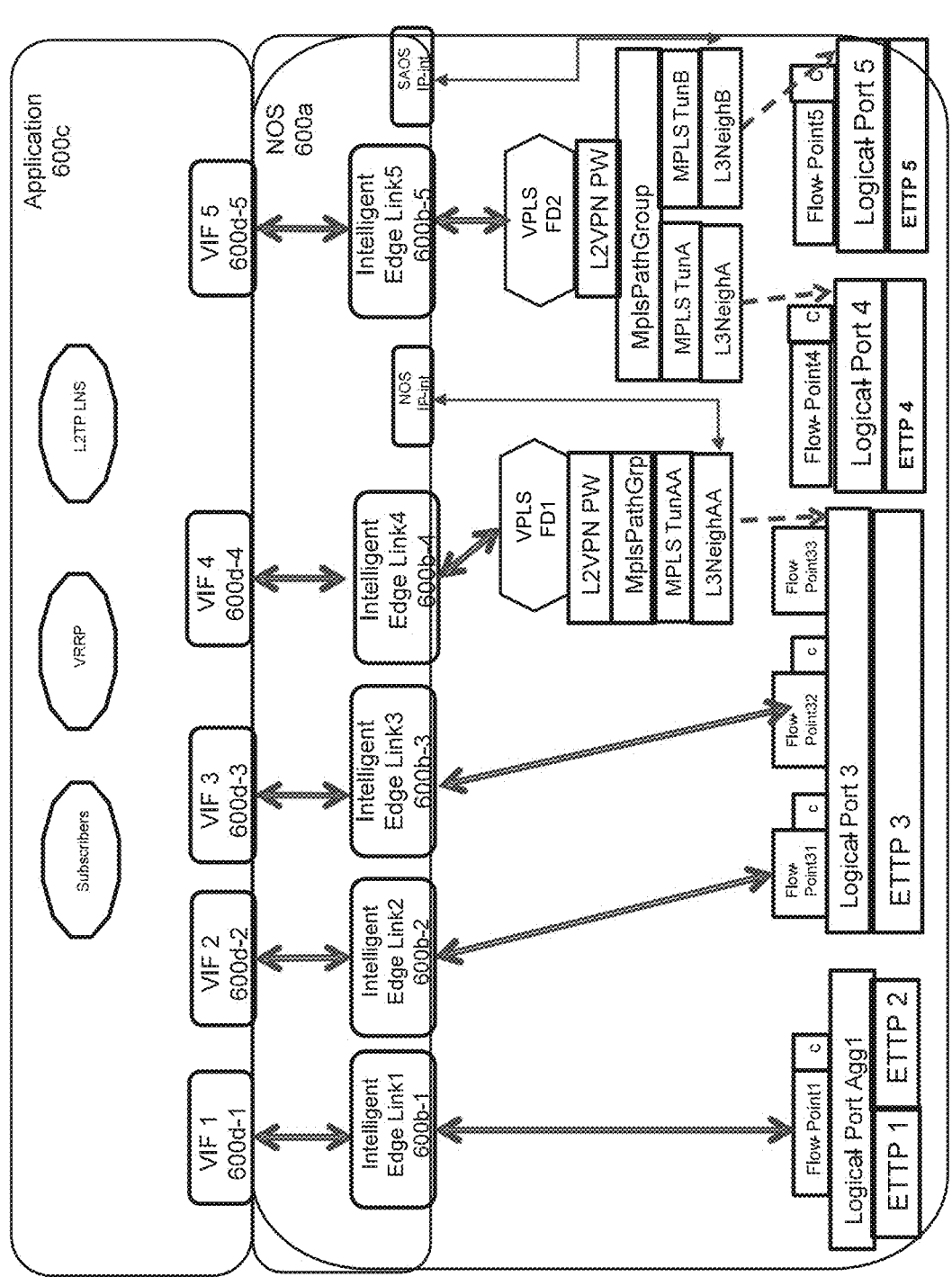

Referring to FIG. 6, in one or more embodiments, router 600 can be provisioned with a $3^{rd}$ party application 600c separate from a NOS 600a. Further, the router 600 can provision intelligent edge link 600b-1, intelligent edge link 600b-2, intelligent edge link 600b-3, intelligent edge link 600b-4, and intelligent edge link 600b-5, each of which associated with the $3^{rd}$ party application 600c. In addition, intelligent edge link 600b-1 can be mapped to virtual interface 600d-1, intelligent edge link 600b-2 can be mapped to virtual interface 600d-2, intelligent edge link 600b-3 can be mapped to virtual interface 600d-3, intelligent edge link 600b-4 can be mapped to virtual interface 600d-4, and intelligent edge link 600b-5 can be mapped to virtual interface 600d-5. Each of the virtual interfaces are associated with application 600c. Also, each of the intelligent edge links can have a different underlay.

In one or more embodiments, FIG. 6 can depict an embodiment of a NOS intelligent edge link (access side) that can include an access side interface on a physical port, access side interface on LAG port, and access side with pseudowire.

Figure 7:
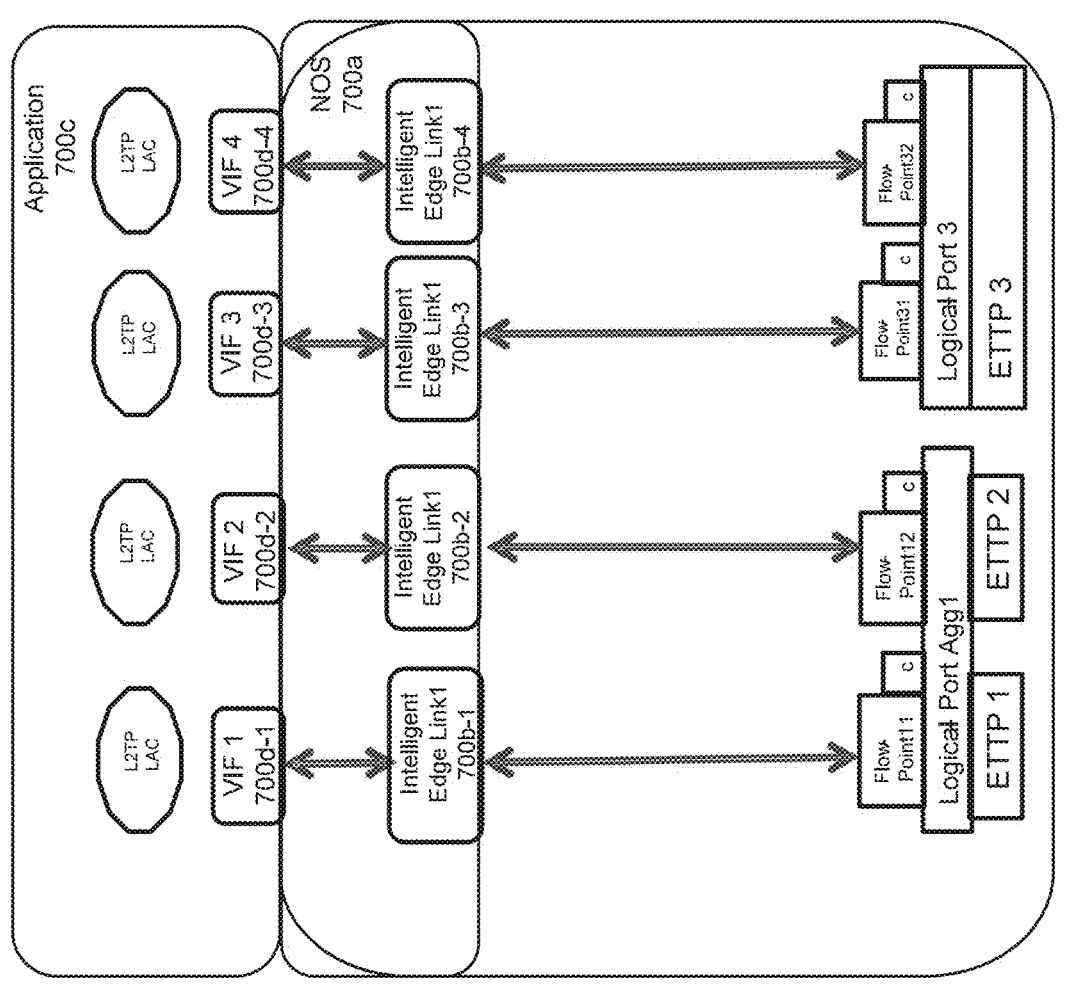

Referring to FIG. 7, in one or more embodiments, router 700 can be provisioned with a $3^{rd}$ party application 700c separate from a NOS 700a. Further, the router 700 can provision intelligent edge link 700b-1, intelligent edge link 700b-2, intelligent edge link 700b-3, and intelligent edge link 700b-4 each of which associated with application 700c. In addition, intelligent edge link 700b-1 can be mapped to virtual interface 700d-1, intelligent edge link 700b-2 can be mapped to virtual interface 700d-2, intelligent edge link 700b-3 can be mapped to virtual interface 700d-3, and intelligent edge link 700b-4 can be mapped to virtual interface 700d-4. Each of the virtual interfaces are associated with $3^{rd}$ party application 700c. Also, each of the intelligent edge links can have a different underlay.

In one or more embodiments, FIG. 7 can depict an embodiment of a NOS application connector interface (network side) that can include a network side interface on a physical port for an L2TP in the application as well as a network side interface on a LAG port for L2TP LAC in the application.

Figure 8:
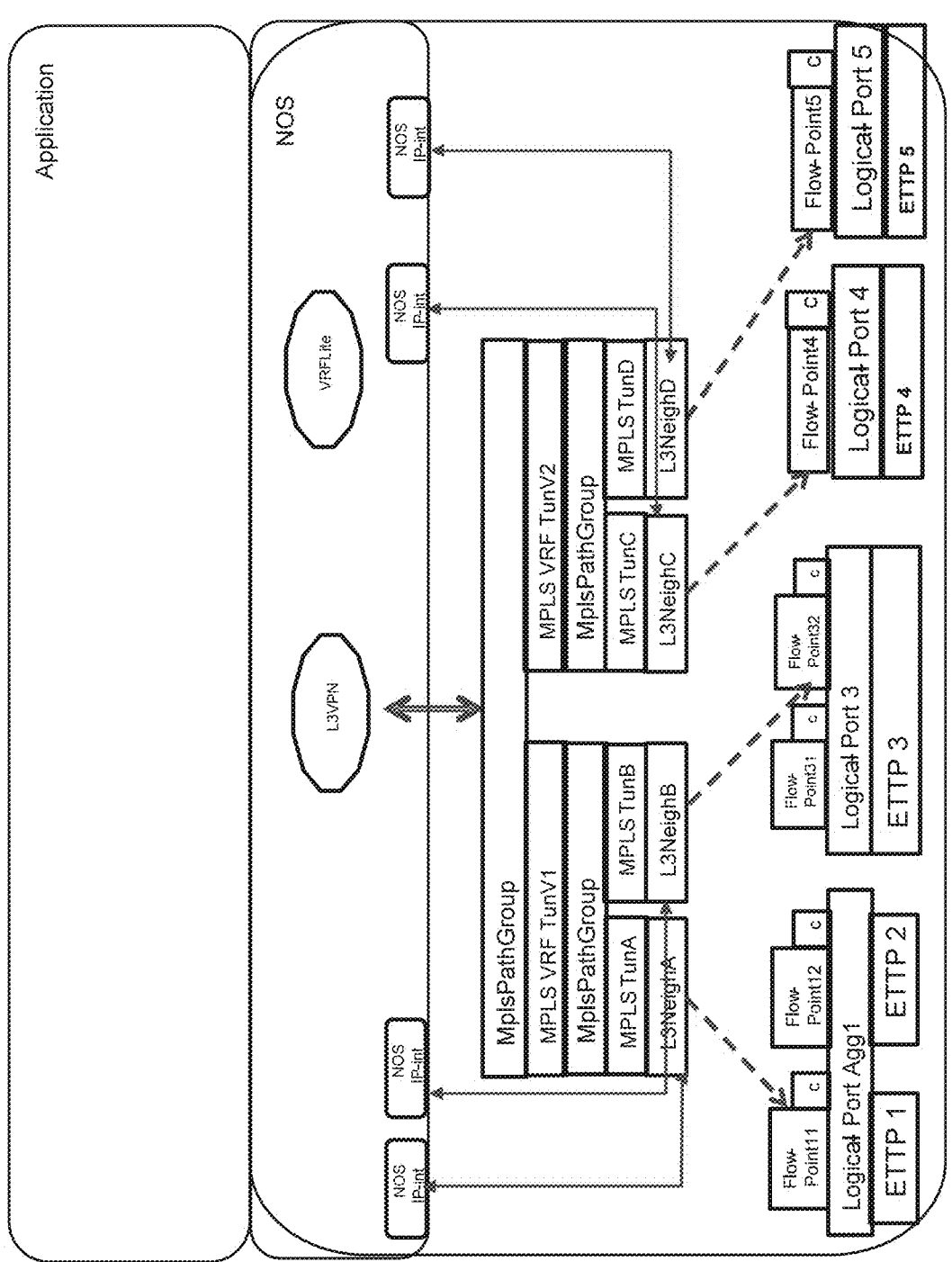

Referring to FIG. 8, in one or more embodiments, FIG. 8 depicts a NOS intelligent edge link network side that includes a network side interface with VRFLite and a network side interface with L3VPN in which an intelligent edge link is provisioned and implemented accordingly.

Figure 9:
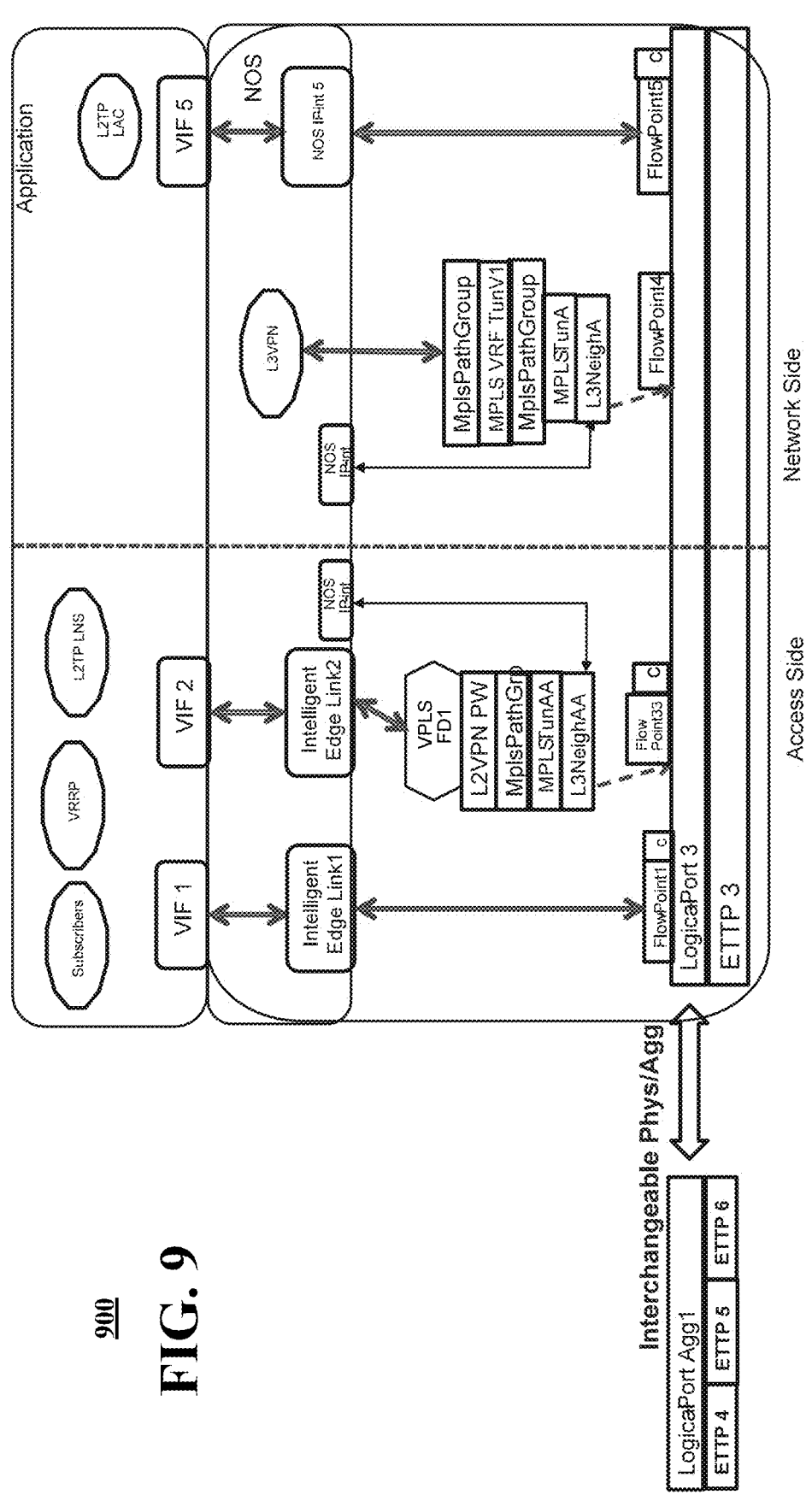

Referring to FIG. 9, in one or more embodiments, FIG. 9 depicts a NOS intelligent edge link that includes an access side and network side interface on same physical/LAG port in which an intelligent edge link is provisioned and implemented accordingly.

Figure 10:
FIG. 10 depicts an illustrative embodiment of a method in accordance with various aspects described herein.

FIG. 10 depicts an illustrative embodiment of a method 1000 in accordance with various aspects described herein. Aspects of method 1000 can be implemented by various aspects of a router. In one or more embodiments, method 1000 can include the router, at 1000x, executing a network operation system and method 1000 can include, at 1000a, provisioning a first application onto the router. Further, the method 1000 can include the router, at 1000b, provisioning a first intelligent edge link onto the router, the first intelligent link being associated with the first application within the network operating system. The first application is separate from the network operating system. In addition, the method 1000 can include the router, at 1000c, mapping the first intelligent edge link to a first virtual interface associated with the first application. The first virtual interface is within the first application separate from the network operating system.

In one or more embodiments, the method 1000 can include the router, at 1000d, receiving first data associated with the first application from a first communication device over a communication network. Further, the method 1000 can include the router, at 1000e, providing the first data to first application via the first intelligent edge link. In addition, the method 1000 can include the first virtual interface of the first application, at 1000f, receiving the first data from the first intelligent edge link.

In one or more embodiments, the first application can comprise a BNG application. Further, the method 1000 can include the BNG application, at 1000g, processing the first data. In addition, the method 1000 can include BNG application, at 1000h, providing the first data to the NOS. Also, the method 1000 can include the NOS, at 1000i, receiving the first data from the BNG application. Further, the method 1000 can include the NOS, at 1000j, routing the first data utilizing multiprotocol label switching (MPLS).

In one or more embodiments, the method 1000 can include, at 1000k, provisioning the router with a second application. Further, the method 1000 can include, at 10001, provisioning the router with a second intelligent edge link associated with the second application within the network operating system. The second application is separate from the network operating system. In addition, the method 1000 can include the router, at 1000m, mapping the second intelligent edge link to a second virtual interface associated with the second application. The second virtual interface is within the second application separate from the network operating system. Also, the method 1000 can include the router, at 1000n, receiving second data associated with the second application from a second communication device.

In one or more embodiments, the method 1000 can include, at 10000, provisioning the router with a third intelligent edge link associated with the first application within the network operating system. Further, the method 1000 can include the router, at 1000p, mapping the third intelligent edge link to a third virtual interface associated with the first application. The third virtual interface is within the first application separate from the network operating system. In addition, the method 1000 can include the router, 1000q, receiving third data associated with the first application from a third communication device.

In some embodiments, the router comprises a provider edge router. In further embodiments, an application described herein can be a $3^{rd}$ party application and in additional embodiments an application can be an application other than a $3^{rd}$ party application.

While for purposes of simplicity of explanation, the respective processes are shown and described as a series of blocks in FIG. 10, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks of FIG. 10 can be performed in response to one or more blocks.

Portions of some embodiments can be combined with portions of the other embodiments.

Figure 11:
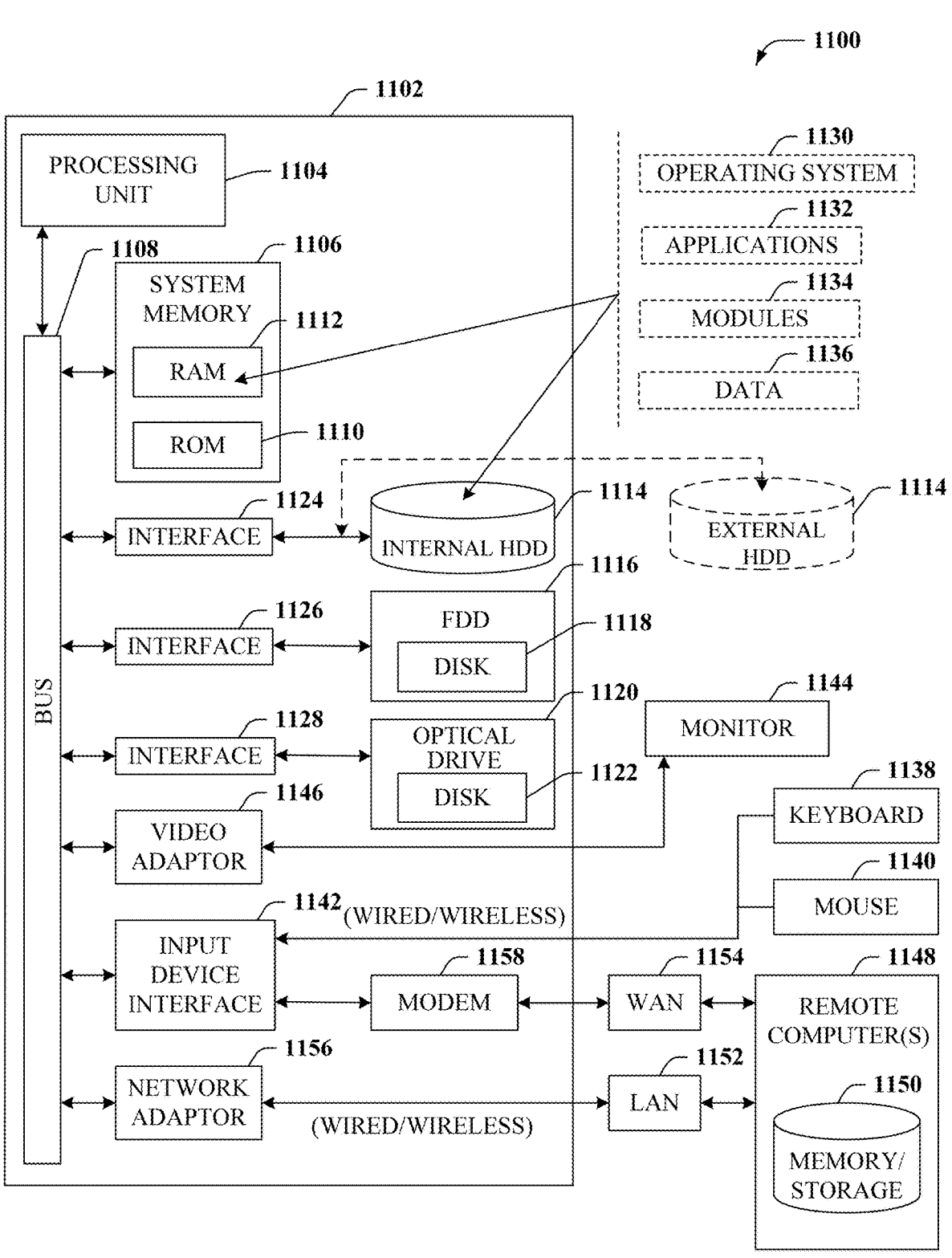
FIG. 11 is a block diagram of an example, non-limiting embodiment of a computing environment in accordance with various aspects described herein.

Turning now to FIG. 11, there is illustrated a block diagram of a computing environment in accordance with various aspects described herein. In order to provide additional context for various embodiments of the embodiments described herein, FIG. 11 and the following discussion are intended to provide a brief, general description of a suitable computing environment 1100 in which the various embodiments of the subject disclosure can be implemented. For example, computing environment 1100 can facilitate in whole or in part provisioning and implementing an intelligent edge link on a router. Further, each of router 100, router 200, router 300, router 400, router 500, router 600, router 700, router 800, and router 900 can comprise computing environment 1100.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 11, the example environment can comprise a computer 1102, the computer 1102 comprising a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multiprocessor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 comprises ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also comprise a high-speed RAM such as static RAM for caching data.

The computer 1102 further comprises an internal hard disk drive (HDD) 1114 (e.g., EIDE, SATA), which internal HDD 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high-capacity optical media such as the DVD). The HDD 1114, magnetic FDD 1116 and optical disk drive 1120 can be connected to the system bus 1108 by a hard disk drive interface 1124, a magnetic disk drive interface 1126 and an optical drive interface 1128, respectively. The hard disk drive interface 1124 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, comprising an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can comprise a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a universal serial bus (USB) port, an IR interface, etc.

A monitor 1144 or other type of display device can be also connected to the system bus 1108 via an interface, such as a video adapter 1146. It will also be appreciated that in alternative embodiments, a monitor 1144 can also be any display device (e.g., another computer having a display, a smart phone, a tablet computer, etc.) for receiving display information associated with computer 1102 via any communication means, including via the Internet and cloud-based networks. In addition to the monitor 1144, a computer typically comprises other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically comprises many or all of the elements described relative to the computer 1102, although, for purposes of brevity, only a remote memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the LAN 1152 through a wired and/or wireless communication network interface or adapter 1156. The adapter 1156 can facilitate wired or wireless communication to the LAN 1152, which can also comprise a wireless AP disposed thereon for communicating with the adapter 1156.

When used in a WAN networking environment, the computer 1102 can comprise a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, struc-
tured data or unstructured data. Computer-readable storage
media can comprise the widest variety of storage media
including tangible and/or non-transitory media which can be
used to store desired information. In this regard, the terms
"tangible" or "non-transitory" herein as applied to storage,
memory or computer-readable media, are to be understood
to exclude only propagating transitory signals per se as
modifiers and do not relinquish rights to all standard storage,
memory or computer-readable media that are not only propagating transitory signals per se.

In addition, a flow diagram may include a "start" and/or
"continue" indication. The "start" and "continue" indica-
tions reflect that the steps presented can optionally be
incorporated in or otherwise used in conjunction with other
routines. In this context, "start" indicates the beginning of
the first step presented and may be preceded by other
activities not specifically shown. Further, the "continue"
indication reflects that the steps presented may be performed
multiple times and/or may be succeeded by other activities
not specifically shown. Further, while a flow diagram indi-
cates a particular ordering of steps, other orderings are
likewise possible provided that the principles of causality
are maintained.

As may also be used herein, the term(s) "operably coupled
to", "coupled to", and/or "coupling" includes direct coupling
between items and/or indirect coupling between items via
one or more intervening items. Such items and intervening
items include, but are not limited to, junctions, communi-
cation paths, components, circuit elements, circuits, functional blocks, and/or devices. As an example of indirect
coupling, a signal conveyed from a first item to a second
item may be modified by one or more intervening items by
modifying the form, nature or format of information in a
signal, while one or more elements of the information in the
signal are nevertheless conveyed in a manner than can be
recognized by the second item. In a further example of
indirect coupling, an action in a first item can cause a
reaction on the second item, as a result of actions and/or
reactions in one or more intervening items.

Although specific embodiments have been illustrated and
described herein, it should be appreciated that any arrange-
ment which achieves the same or similar purpose may be
substituted for the embodiments described or shown by the
subject disclosure. The subject disclosure is intended to
cover any and all adaptations or variations of various
embodiments. Combinations of the above embodiments, and
other embodiments not specifically described herein, can be
used in the subject disclosure. For instance, one or more
features from one or more embodiments can be combined
with one or more features of one or more other embodi-
ments. In one or more embodiments, features that are
positively recited can also be negatively recited and
excluded from the embodiment with or without replacement
by another structural and/or functional feature. The steps or functions described with respect to the embodiments of the
subject disclosure can be performed in any order. The steps
or functions described with respect to the embodiments of
the subject disclosure can be performed alone or in combi-
nation with other steps or functions of the subject disclosure,
as well as from other embodiments or from other steps that
have not been described in the subject disclosure. Further,
more than or less than all of the features described with
respect to an embodiment can also be utilized.

What is claimed is:

1. A router, comprising:
a processing system including a processor; and a memory that stores executable instructions that, when
executed by the processing system, facilitate perfor-
mance of operations, the operations comprising:
executing a network operating system;
provisioning a first application onto the router;
provisioning a first intelligent edge link onto the router,
the first intelligent edge link being associated with the
first application within the network operating system,
wherein the first intelligent edge link is a separate
interface from a kernel interface, wherein the first
application is separate from the network operating
system; and
mapping the first intelligent edge link to a first virtual
interface associated with the first application, wherein
the first virtual interface is within the first application
separate from the network operating system.

2. The router of claim 1, wherein the operations further
comprise receiving first data associated with the first appli-
cation from a first communication device over a communi-
cation network.

3. The router of claim 2, wherein the first data is provided
to the first application via the first intelligent edge link.

4. The router of claim 3, wherein the first virtual interface
of the first application receives the first data from the first
intelligent edge link.

5. The router of claim 2, wherein the first application
comprises a broadband network gateway (BNG) application.

6. The router of claim 5, wherein the BNG application
processes the first data and provides the first data to the
network operating system, wherein the operations further
comprise:
receiving, by the network operating system, the first data
from the BNG application; and
routing, by the network operating system, the first data
utilizing multiprotocol label switching (MPLS).

7. The router of claim 1, wherein the first intelligent edge
link defines a construct that applies to a forwarding plane
delineation and software-based provisioning of a forwarding
plane.

8. The router of claim 1, wherein the operations further
comprise:
provisioning a second application onto the router;
provisioning a second intelligent edge link onto the router,
the second intelligent edge link being associated with
the second application, wherein the second application
is separate from the network operating system;
mapping the second intelligent edge link to a second
virtual interface associated with the second application,
wherein the second virtual interface is within the sec-
ond application separate from the network operating
system; and
receiving second data associated with the second appli-
cation from a second communication device.

9. The router of claim 1, wherein the operations further
comprise:
provisioning a third intelligent edge link onto the router,
the third intelligent edge link being associated with the
first application;
mapping the third intelligent edge link to a third virtual
interface associated with the first application, wherein
the third virtual interface is within the first application
separate from the network operating system; and
receiving third data associated with the first application
from a third communication device.

10. A non-transitory machine-readable medium, compris-
ing executable instructions that, when executed by a processing system including a processor, facilitate performance of operations, the operations comprising:

executing a network operating system;

provisioning an application onto the processing system;

provisioning a first intelligent edge link onto the process- ing system, the first intelligent edge link being associated with the application within a network operating system, wherein the first intelligent edge link is a separate interface from a kernel interface, wherein the application is separate from the network operating system; and mapping the first intelligent edge link to a first virtual interface associated with the application, wherein the first virtual interface is within the application separate from the network operating system.

11. The non-transitory machine-readable medium of claim 10, wherein the operations further comprise receiving data associated with the application from a first communication device over a communication network.

12. The non-transitory machine-readable medium of claim 11, wherein the data is provided to the application via the first intelligent edge link.

13. The non-transitory machine-readable medium of claim 12, wherein the first virtual interface receives the data from the first intelligent edge link.

14. The non-transitory machine-readable medium of claim 11, wherein the application comprises a broadband network gateway (BNG) application.

15. The non-transitory machine-readable medium of claim 14, wherein the BNG application processes the data and provides the data to the network operating system, wherein the operations further comprise:

receiving, by the network operating system, the data from the BNG application; and routing, by the network operating system, the data utilizing multiprotocol label switching (MPLS).

16. The non-transitory machine-readable medium of claim 15, wherein the processing system comprises a provider edge router.

17. A method, comprising:

executing, by a processing system including a processor, a network operating system;

provisioning, by the processing system, an application onto the processing system;

provisioning, by the processing system, a first intelligent edge link onto the processing system, the first intelligent edge link being associated with the application within the network operating system, wherein the first intelligent edge link is a separate interface from a kernel interface, wherein the application is separate from the network operating system; and mapping, by the processing system, the first intelligent edge link to a first virtual interface associated with the application, wherein the first virtual interface is within the application separate from the network operating system.

18. The method of claim 17, further comprising receiving, by the processing system, data associated with the application from a first communication device over a communication network.

19. The method of claim 18, wherein the data is provided to the application via the first intelligent edge link, and wherein the first virtual interface receives the data from the first intelligent edge link.

20. The method of claim 17, wherein the method of claim 17 is performed by one of a physical router and a virtual router.

\*   \*   \*   \*   \*